April 23, 1963
W. C. PECK
3,086,394
TAKE-OFF MONITOR
Filed Jan. 12, 1959
3 Sheets-Sheet 1
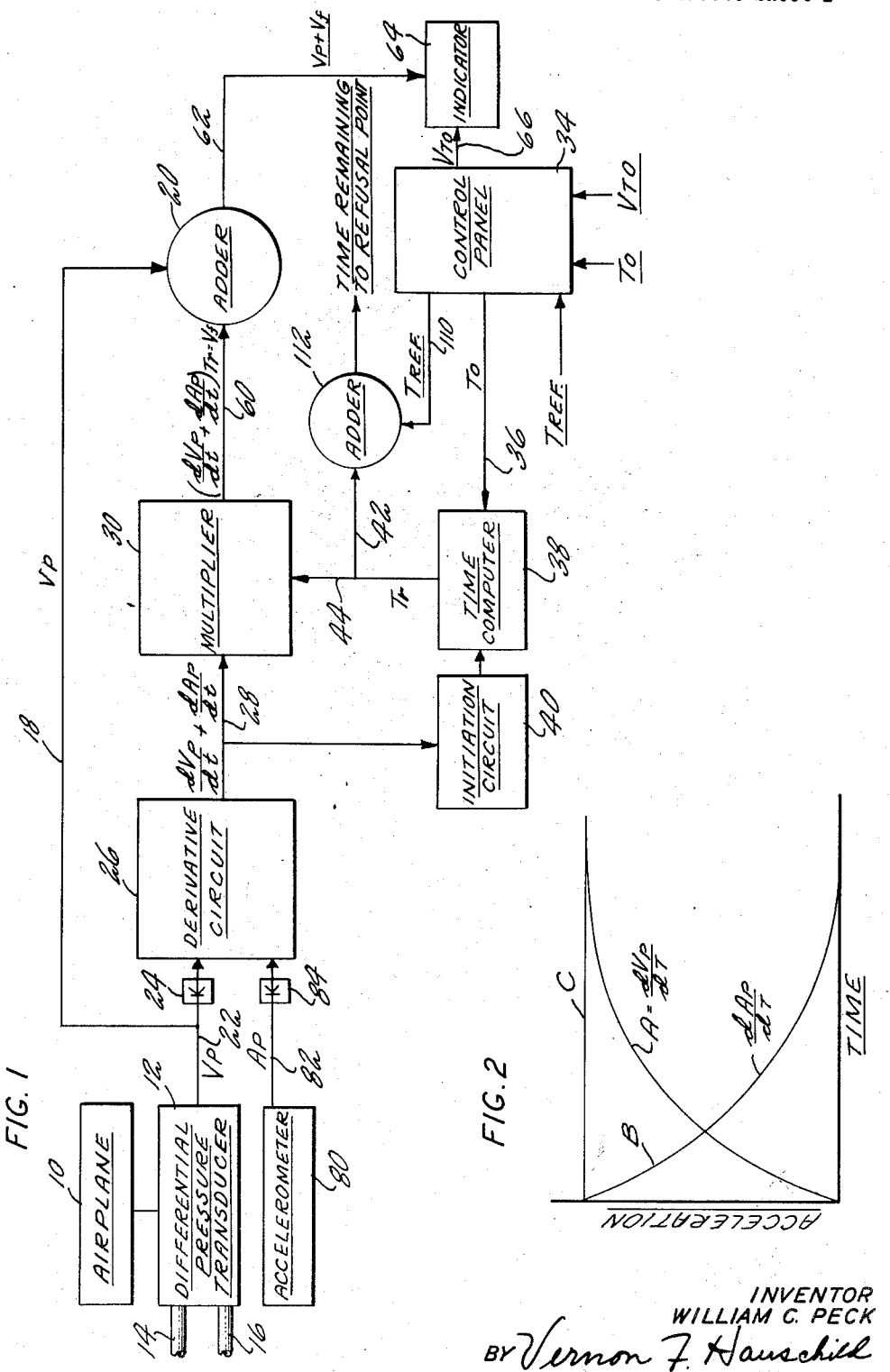
INVENTOR
WILLIAM C. PECK
BY Vernon F. Hauschild
ATTORNEY April 23, 1963 W. C. PECK 3,086,394
TAKE-OFF MONITOR
Filed Jan. 12, 1959 3 Sheets-Sheet 2

INVENTOR
WILLIAM C. PECK
BY Vernon F. Hauschild
ATTORNEY

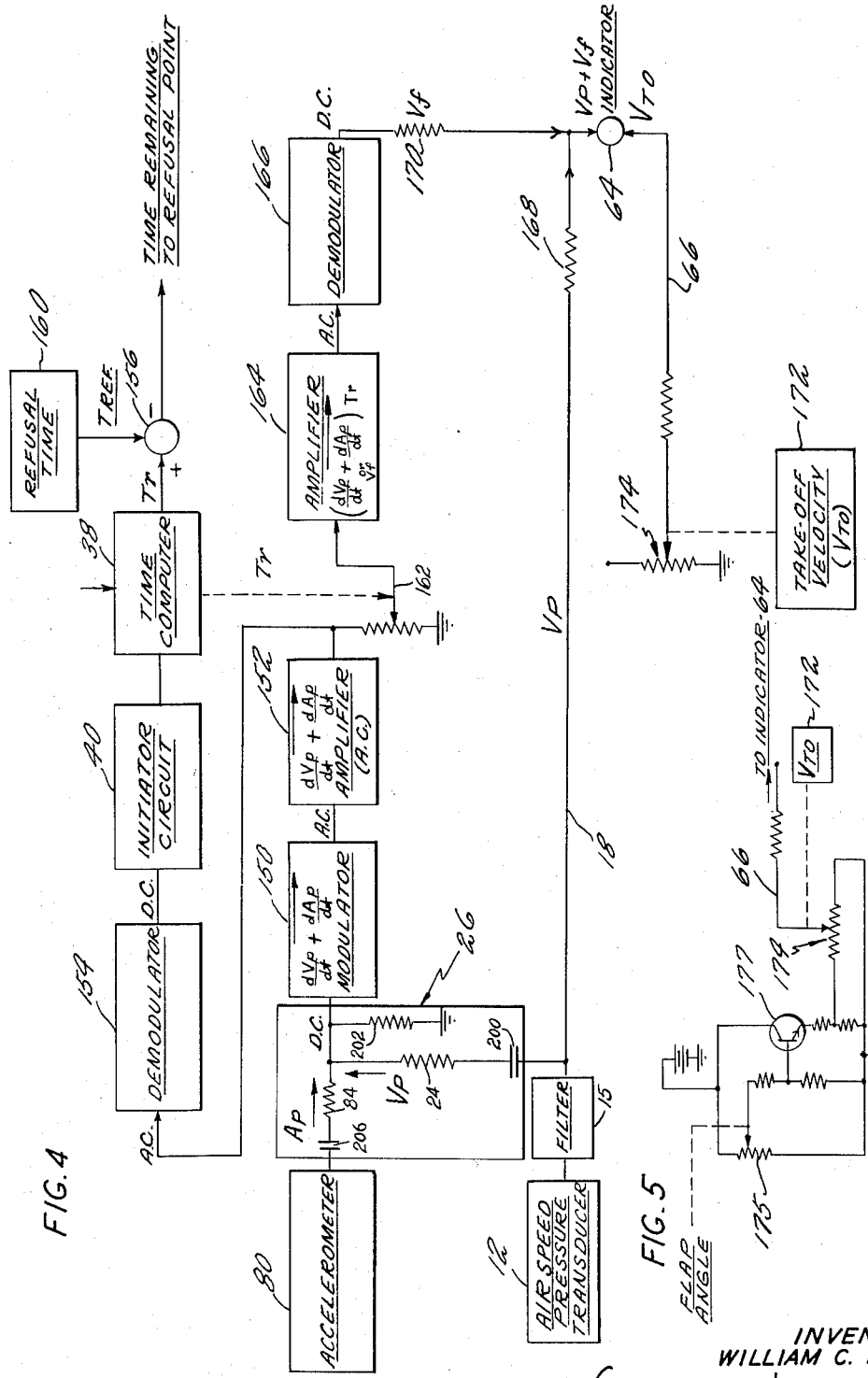

3,086,394
TAKE-OFF MONITOR
William C. Peck, Hazardville, Conn., assignor to United Aircraft Corporation, East Hartford, Conn., a corporation of Delaware
Filed Jan. 12, 1959, Ser. No. 786,331
6 Claims. (Cl. 73—178)

This invention relates to airplane take-off safety and more particularly to the teaching of an aircraft take-off monitor.

In the age of jet aircraft, a number of problems have arisen not previously troublesome with propeller-driven planes. Among these problem areas have been the hazards and uncertainties of take-off. It is important that falsely aborted take-offs should be avoided from a safety, economy and operations standpoint and it is equally as important that the pilot be warned as early as possible in take-off roll whether, under the present airplane and climatic conditions, the airplane will be airborne at take-off point. If the airplane is incapable of proper take-off under these conditions, the pilot should begin his braking attempts as early as possible.

It is an object of this invention to provide mechanism which will advise the aircraft pilot early in the take-off roll whether the aircraft will be airborne at the runway take-off point.

It is a further object of this invention to teach an airplane take-off monitor in which the present aircraft velocity ($V_p$) and acceleration ($A_p$) are ascertained early in the take-off roll and continuously thereafter, then differentiated and multiplied by the time remaining ($T_r$) or the distance remaining ($D_R$) to the runway take-off point to provide a product, which product and present velocity ($V_p$) are added and compared to the calculated take-off velocity ($V_{TO}$), required lift or aircraft weight to ascertain early in the aircraft takeoff roll and continuously thereafter whether the airplane will be airborne at take-off point.

Experience has shown that when a pressure transducer is used to ascertain present aircraft velocity ($V_p$), noise is introduced into the monitor electrical system. To avoid the inaccuracies in the $V_p$ and $A_p$ signals caused by the noise, it was found advisable to filter the noise from the electrical system, however, the filtering process introduced a lag in the $V_p$ and $A_p$ signals. It is, accordingly, a further object of this invention to add an aircraft present acceleration ($A_p$) signal to be differentiated with and added preferably, after differentiation, with the differentiated $V_p$ signal to compensate for the lag in the $V_p$ and $A_p$ signals.

Other objects and advantages will be apparent from the specification and claims, and from the accompanying drawings which illustrate an embodiment of the invention.

FIG. 1 represents a block diagram of my take-off monitor.

FIG. 2 is a graphic representation of the effect which the signal from our accelerometer has upon the signal from my differential pressure transducer to compensate for the lag introduced into my monitor to overcome noise.

FIG. 4 is an electrical diagram illustrating my take-off monitor.

FIG. 5 is an electrical schematic showing compensation for airplane flap angle.

Figures 3, 6:
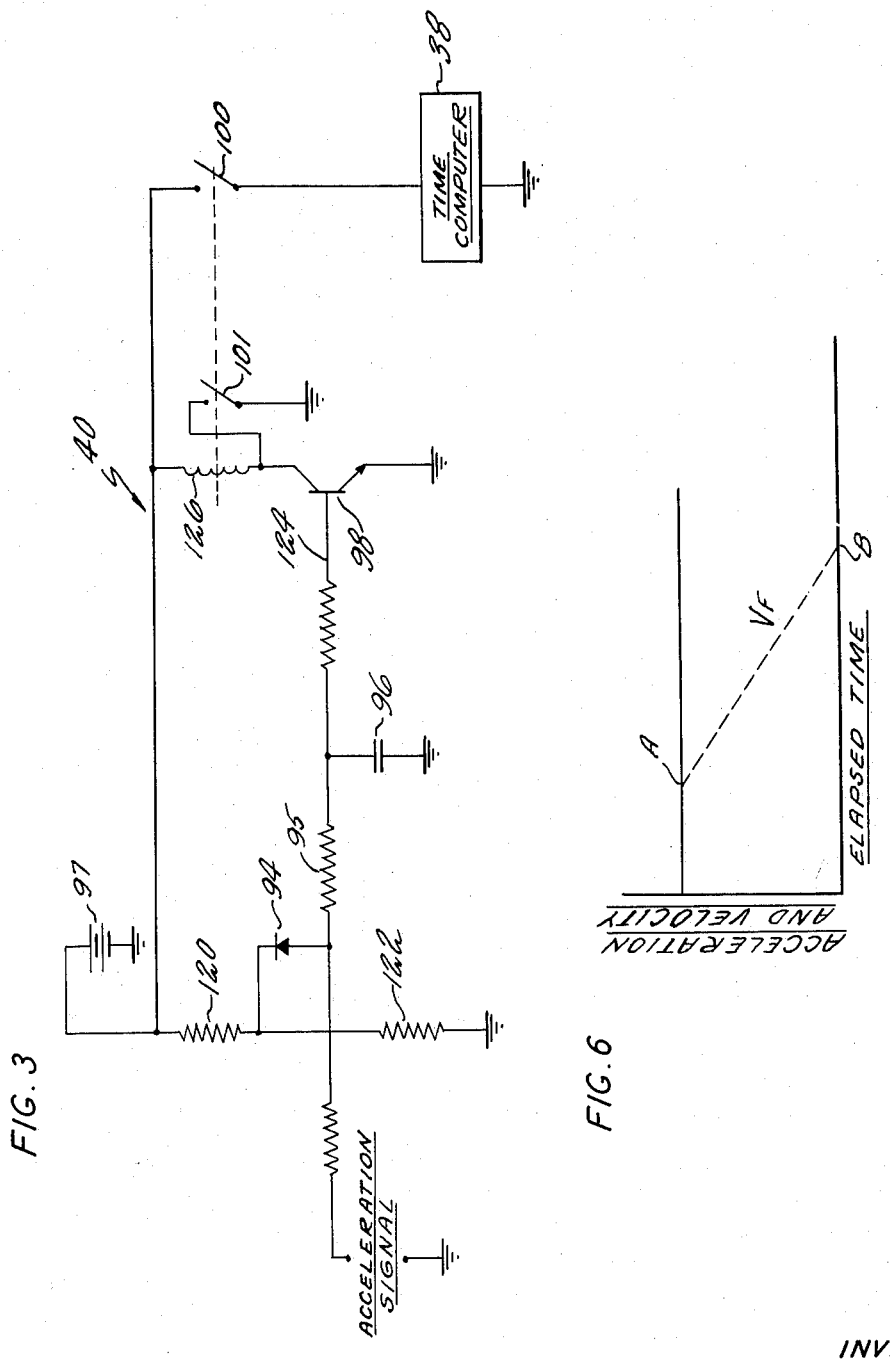
FIG. 3 is an electrical diagram showing our initiation circuit.
FIG. 6 is a graphic representation of the effect of multiplying the acceleration signal by time remaining to the take-off point to obtain a predicted future velocity signal.

My take-off monitor has been designed so that it will calculate early in take-off roll a predicted aircraft lift or aircraft velocity a tthe runway take-off point, based upon airplane and climatic conditions, for example, aircraft gross weight, assisted take-off, flap angle, runway gradient and surface conditions, altitude, dew point, and air temperature, and compare same to the manually calculated lift required to overcome aircraft weight or to the aircraft take-off velocity ($V_{TO}$) which will be necessary to permit take-off at take-off point. The mathematical derivation of the equation which will be used by my take-off monitor will now be fully explained.

The lift available from an aircraft is given by the equation:

Equation 1:
$$L=\frac{AC_1\rho}{2}(V_p+V_w)^2$$

$L$=lift
$A$=effective wing area
$C_1$=coefficient of lift at the maximum angle of attack to be used at take-off
$\rho$=air density
$V_p$=aircraft ground velocity
$V_w$=wind velocity parallel with aircraft At take-off, the lift must at least equal the weight (W) of the aircraft, so that, at take-off, Equation 2:
$$V_p+V_w \geq \sqrt{\frac{2W}{AC_1\rho}}$$

The difference between static and total pressure ($\Delta P$) at the front of the aircraft is:

Equation 3:
$$\Delta P=\frac{\rho}{2}(V_p+V_w)^2$$

If a pressure transducer is used to convert the pressure difference, $\Delta P$, into a voltage E, which is proportional to the square root of $\Delta P$, the following relationships are established:

Equation 4:
$$E=K\sqrt{\Delta P}$$

Equation 5:
$$E=K\sqrt{\frac{\rho}{2}}(V_p+V_w)$$

Equation 6:
$$V_p+V_w=E\frac{1}{K}\sqrt{\frac{2}{\rho}}$$

The rate of acceleration will tend to remain constant during the take-off run, since both the engine thrust and drag build up with air speed.

If we assume that the acceleration of the aircraft remains constant during the take-off run, we can compute the ground speed which will exist at take-off point by multiplying the rate of change of velocity by the time remaining ($T_r$) before the aircraft reaches take-off point, and adding this value to the existing airplane velocity. Thus, Equation 7:
$$V_p+V_w+\frac{dV_p}{dt}T_r=\text{take-off velocity }(V_{TO})$$

From the lift equation previously developed, Equation 2, we know that the air speed at take-off must be greater than a value obtained by transposing in Equation 2 so that:

Equation 8:
$$V_p \geq \sqrt{\frac{2W}{AC_1\rho}}-V_w$$

The time ($T_0$) required to make the take-off run will be equal to the runway length to take-off point (X) divided by the average velocity. Since the acceleration will be essentially constant, the average velocity will be equal to one-half the final velocity, so that:

Equation 9:

$$T_o = \frac{2X}{\sqrt{\frac{2W}{AC_1\rho}} - V_w}$$

The normal wind velocity is small compared to the required air speed at take-off, so that variations in wind velocity will not have a large effect on the time required to complete the take-off run. The normal variation in air density and take-off weight will also have a relatively small effect on the take-off time $T_o$, since these parameters do not vary over a wide range, and also because the take-off time is effected as a function of the square root of these parameters. While all these variables could be included in the calculation of the take-off time, it is felt that all variations other than runway length can be ignored, so that:

Equation 10:

$$T_o = K_1 X$$

Equation 11:

$$K_1 = \frac{2}{\sqrt{\frac{2W_{max}}{AC_1\rho_o}}}$$

$W_{max}$ = maximum take-off weight
$\rho_o$ = standard air density

The time remaining before the aircraft reaches the take-off point can be obtained by calculating $T_o$, and subtracting the time elapsed ($t$) since the start of the take-off run.

The rate of change of air speed can be used as a measure of the rate of change of aircraft velocity if we assume that the wind velocity remains relatively constant. Thus:

Equation 12:

$$\frac{dV_p}{dt} = \frac{1}{K}\sqrt{\frac{2}{\rho}}\frac{dE}{dt}$$

(using Equation 6 and disregarding $V_w$) and the calculated air speed at the take-off point is equal to:

Equation 13:

Calculated take-off point air speed $= V_p + \frac{dV_p}{dt}(T-t)$ (using Equation 7).

Equation 14:

Calculated take-off point air speed $\frac{1}{K}=\sqrt{\frac{2}{\rho}}$ $$\left[E + \frac{dE}{dt}(T-t)\right]$$

incorporating Equation 6.

The required air speed has previously been calculated to be equal to:

Equation 15:

$$V_p = \sqrt{\frac{2}{\rho}}\sqrt{\frac{W}{AC_1}}$$

(see Equation 8).

When the calculated air speed is equal to the required air speed, the take-off is just possible, and Equation 16:

Calculated air speed

Required air speed $$\frac{1}{K}\sqrt{\frac{2}{\rho}}\left[E + \frac{dE}{dt}(T-t)\right] = \sqrt{\frac{2}{\rho}}\sqrt{\frac{W}{AC_1}}$$

Equation 17:

$$E + \frac{dE}{dt}(T-t) = K\sqrt{\frac{W}{AC_1}}$$

or, since E is proportional to $V_p$,

Equation 18:

$$V_p + \frac{dV_p}{dt}(T-t) = K\sqrt{\frac{W}{AC_1}}$$

Since the right hand side of Equation 18 is representative of the airplane speed or velocity necessary for successful take-off, as calculated in Equations 8 and 16 it will be referred to as take-off velocity ($V_{TO}$)

Equation 19:

$$K\sqrt{\frac{W}{AC_1}} = V_{TO}$$

and the term $$\frac{dV_p}{dt}(T-t)$$

since it is the velocity which will be added to the present velocity ($V_p$) during the time remaining ($T_r$) before take-off point assuming a constant acceleration, will be referred to as future gained velocity ($V_t$), Equation 20:

$$\frac{dV_p}{dt}(T-t) = \frac{dV_p}{dt}T_r = V_t$$

It will be shown later that due to necessary filtering a lag is introduced into the $V_p$ signal, and is also present in the $$\frac{dV_p}{dt}$$

signal. To compensate for the lag, an additional term $$\frac{dA_p}{dt}$$

which is the derivative of the present acceleration, is added, thus making the $V_t$ signal:

Equation 21:

$$V_t = \left(\frac{dV_p}{dt} + \frac{dA_p}{dt}\right)T_r$$

It is apparent, however, that this is done only to compensate for a discrepancy introduced to eliminate noise, and can be disregarded in the theoretical approach.

Once the necessary substitutions have been made, the final working equation is:

Equation 22:

$$V_p + V_t = V_{TO}$$

which states that the present velocity of the aircraft plus the velocity which will be gained by reason of present acceleration must equal or exceed the velocity necessary for the aircraft to take off if a successful take-off is to be made.

When the left side of Equation 18 or 22 is larger than the right side, the take-off run is proceeding satisfactorily. When the left side is the smaller of the two, the take-off attempt must be stopped.

In the fashion now to be described, my take-off monitor is used to derive the calculated air speed or left side of Equation 18, i.e., $$V_p + \frac{dV_p}{dt}(T-t)$$

while the required air speed ($V_{TO}$) or right side of Equation 18 is calculated in advance and preferably manually entered into our control panel for monitor comparison purposes.

Referring to FIG. 1 we see that airplane 10, which may be of any conventional type well-known in the art, which carries therewith on its take-off run differential pressure transducer 12 which includes total pressure tap 14 and static pressure tap 16 to provide a pressure differential proportional to aircraft runway velocity or present velocity ($V_p$) which, in accordance with Equations 4 and 17 generates voltage E. From differential pressure transducer 12, the present velocity ($V_p$) signal in the form of voltage E is transmitted both through line 18 to adder 20 and also through line 22 and attenuator 24 into derivative or differential circuit 26, from which and through line 28 a velocity derivative signal $$\frac{(dV_p)}{dt}$$

which represents present acceleration ($A_p$), is transmitted to multiplier 30. At the same time that the velocity derivative signal $$\frac{(dV_p)}{dt}$$

is being provided to multiplier 30, a second signal known as runway time remaining ($T_r$) is also provided to multiplier 30 in the following fashion. Total runway time ($T_o$), namely the time from the beginning of take-off roll to take-off point is calculated in advance and manually entered into control panel 34 from whence it passes along line 36 into time computer 38, which is essentially a clock which commences running at a time dictated by initiation circuit 40 in a fashion to be described hereinafter in connection with FIG. 3, and indicates elapsed time ($t$).

The two signals, total runway time ($T_o$) and elapsed runway time ($t$), are subtracted in time computer 38 to derive remaining runway time ($T_r$). This remaining time signal $T_r$ is the second signal which enters multiplier 30 through line 44 simultaneously with the velocity derivative signal from line 28. From multplier 30, the future gained velocity signal $V_f$, which is equal to $$\left(\frac{dV_p}{dt}+\frac{dA_p}{dt}\right)T_r$$

(the $$\frac{dA_p}{dt}$$

signal will be described hereinafter) is passed through line 60 to adder 20 together with the present velocity signal $V_p$ which is provided thereto through line 18. From adder 20 the sum of the present velocity signal $V_p$ and the future velocity signal $V_f$ is transmitted along line 62 to indicator 64 to be compared therewith with the velocity calculated to be necessary for take-off ($V_{TO}$). This calculated take-off velocity ($V_{TO}$) is calculated from the right side of Equation 18 and is manually entered into control panel 34 as, for example, by a dial in the pilot's compartment, and passes along line 66 to provide a required air speed signal, $V_{TO}$, to be compared in indicator 64, preferably in a go-no-go visual or audible signal to indicate to the pilot whether take-off can safely be made or should be aborted. This is the basic take-off monitor, however there are preferred additions which should advantageously be made thereto and which will now be described.

FIG. 6 illustrates graphically how the future velocity signal ($V_f$) is computed. Assuming that acceleration is a constant, initiator circuit 40 will actuate time computer 38 after a specified delay. When this occurs, indicated by A on FIG. 6, time computer 38 will vary potentiometer 162 and effectively multiply the $$\left(\frac{dV_p}{dt}+\frac{dA_p}{dt}\right)$$

signal by the difference between the total runway time ($T_o$) and elapsed time ($t$), which has been called time remaining ($T_r$). The computed time remaining ($T_r$) will be a decreasing value, so that as time passes, $T_r$ will eventually become zero, as point B in FIG. 6. Now the present velocity ($V_p$) must equal the predetermined take-off velocity ($V_{TO}$) for the plane to become airborne. As time remaining ($T_r$) decreases, the computed signal ($V_f$) will also decrease, since in the shorter time remaining a constant acceleration will result in a smaller increase in velocity.

Experience has shown that it is necessary to filter the noise from the velocity signal produced by pressure transducer 12. This filtering may be done by circuit 26 or a separate circuit 15. The filtering introduces a lag into the velocity signal, and, since the acceleration signal is obtained by differentiating the velocity signal, the acceleration signal will also be lagged. Once the acceleration of the aircraft has reached a relatively constant value, the effect of the lag is negligible, but during the first few seconds of take-off roll when the acceleration is undergoing a sharp change, it is important that an accurate acceleration signal be generated. To correct this initial lag and also to provide a lag correction factor any time that there is a substantial change of acceleration, accelerometer 80 is added to the take-off monitor and transmits an acceleration signal through line 82 and attenuator 84 to derivative circuit 26 so that an acceleration derivative signal, $$\frac{dA_p}{dt}$$

is transmitted from derivative circuit 26 along line 28 to multiplier 30. This acceleration derivative signal follows a curve shown as B in FIG. 2 which has a high initial impulse as the airplane changes in motion from standstill during its first few seconds of acceleration but, which quickly decays due to the fact that aircraft acceleration stabilizes after the first few seconds of take-off roll. Curve A of FIG. 2 indicates how the lag introduced by filtering into the $V_p$ signal from pressure transducer 12 appears as a lagged acceleration signal $$\frac{dV_p}{dt}$$

The algebraic sums of curves A and B provide substantially straight line curve C shown in FIG. 2 to provide the necessary stability to our take-off monitor.

Further, since our aircraft will accelerate very rapidly within the first few seconds of take-off roll and then stabilize thereafter and because it is desirable to eliminate pilot start buttons, it is desirable that time computor 38 not commence running during taxiing but delay until a prescribed length of time has elapsed from the beginning of take-off roll and until a given acceleration has been reached. Initiator circuit 40 shown more completely in FIG. 3 accomplishes this function.

An acceleration signal from accelerometer 80 or derivative circuit 26

$$\left[\text{signal}\left(\frac{dV_p}{dt}+\frac{dA_p}{dt}\right)\right]$$

is passed to initiator circuit 40. Clipping diode 94 is biased to some positive voltage by resistors 120 and 122. The function of the clipping diode is to limit the maximum magnitude of the positive voltage and to provide a constant step signal to a time lag circuit comprising resistor 95 and capacitor 96. The integrated output of capacitor 96 will, when it builds up as determined by the time constant of the circuit, forward bias transistor 98 and allow current to flow from source 97 through solenoid 126 and transistor 98 to ground. Energization of solenoid 126 closes switches 100 and 101 and permits a flow of current to actuate time computer 38.

The constant voltage from capacitor 96 coupled with the time constant of the integrator network provides a constant voltage output with respect to time regardless of the input acceleration. This circuit will always energize the time computer at a fixed time after take-off is initiated, making the circuit independent of the acceleration signal.

Closing latch switch 101 gives the current from source 97 an additional path to ground, so that if the acceleration signal should decay and transistor 98 is turned off, solenoid 126 will remain energized and switch 100 will also remain closed.

It is also considered important to advise the pilot when he passes his final refusal point on the runway so that he may take immediate braking action at that point. To accomplish this purpose, we calculate, considering the aircraft and climatic conditions, the time of refusal ($T_{ref.}$) from initial take-off until this refusal point will be reached and put such a signal into control panel 34 from which it is fed through line 110 to adder 112 which also receives from line 42 a time remaining ($T_r$) signal. Adder 112 gives the pilot either visible or audible warning when the difference between time of refusal ($T_{ref.}$) and time remaining ($T_r$) reaches a preselected minimum figure to permit reaction time and effective braking of the airplane within runway length.

FIG. 4 illustrates the electrical circuitry for my take-off monitor. Reference numerals corresponding to those used in the description of FIG. 1 will be used wherever applicable. The present velocity $V_p$ signal from air speed pressure transducer 12 is passed through line 18 and also attenuator 24 and capacitor 200 and resistance 202 of derivative circuit 26 at the same time that the present acceleration signal $A_p$ from accelerometer 80 is passed through attenuator 84 and capacitors 206 and resistance 202 of derivative circuit 26 so that the additive D.C. signal $$\frac{dV_p}{dt} + \frac{dA_p}{dt}$$

is provided to modulator 150 from whence it passes to amplifier 152 as an A.C. signal. The A.C. signal from amplifier 152 passes through two paths. The first of these paths is through demodulator 154 from whence it is passed as a D.C. signal to trigger initiator circuit 40, explained more fully in connection with FIG. 3. The initiator circuit, as fully explained with the description of FIG. 1 starts the clock mechanism of time computer 38 running. From any convenient source such as control panel 34 of FIG. 1, total take-off time $T_o$ is fed into time computer 38 to have elapsed time ($t$) subtracted therefrom so that runway time remaining ($T_r$) is passed from time computer 38 to an adder 156, which also receives computed refusal time ($T_{ref.}$) from member 160 and subtracts time remaining ($T_r$) therefrom to provide the pilot with a signal announcing the approach of the refusal point, which is the last opportunity for the pilot to successfully abort the take-off attempt and commence braking operation. From time computer 38, a time remaining signal ($T_r$) also passes to an electrical multiplier, for example by movement of the wiper of potentiometer 162, where the A.C. signal $$\frac{dV_p}{dt} + \frac{dA_p}{dt}$$

is multiplied by the time remaining signal ($T_r$). Since, after the first few seconds of take-off roll the acceleration derivative $$\frac{dA_p}{dt}$$

becomes zero due to acceleration stability, it can then be ignored. From potentiometer 162 the A.C. signal $$\left(\frac{dV_p}{dt} + \frac{dA_p}{dt}\right)T_r$$

which is equal to the predicted final velocity $V_f$ passes to amplifier 164 and is then changed to D.C. in demodulator 166.

Both the $V_f$ signal in line 60 and the present velocity signal, $V_p$, in line 18 are passed through resistors 168 and 170, much larger than the resistance of indicator 64, to provide a constant current input which is added to form a resultant current proportional to the predicted aircraft velocity at the take-off point. The combined signal $V_p + V_f$ flows into one side of indicator 64. Take-off velocity $V_{TO}$ is passed as a current to indicator 64 from the opposite direction through line 66. Indicator 64 can be a milliammeter, and summation of the actual aircraft velocity current, the product of acceleration $x$ time remaining current, and the required take-off velocity current will deflect the meter in a direction indicative of the actual aircraft condition. A negative indication causes the meter to deflect into the "STOP" region, thereby indicating an inability to take off. Positive current indicates that the predicted velocity at take-off time will be greater than the required take-off velocity, thereby causing the meter to be deflected into the "GO" region. The prominent feature of this type of adder is that there is a negligible interaction between the signal, and it provides for a more linear type of signal addition, eliminating the need for non-linear calibration of the indicating instrument. The indicator, however, may also be an audio instrument or any instrument which will provide the pilot with a continuous signal indicating whether or not the airplane is capable of being airborne at take-off point.

The take-off velocity signal passed by line 66 is indicated in FIG. 4 as being generated by a manually adjusted potentiometer 174. Because the velocity necessary for take-off is a variable dependent on many parameters such as aircraft weight and flap angle, it is possible to manually compute the take-off velocity beforehand. It can be provided, however, that circuitry will perform some of the desired computations. For example, in FIG. 5 a simple circuit is shown in which the wiper arm of potentiometer 175 is varied as a function of flap angle, either continuously or as a multiple position switch arrangement. The flap angle signal is amplified by the emitter follower circuit including transistor 177 and passed through potentiometer 174 where the wiper arm which picks off the voltage to be sent to indicator 64 is varied by a take-off velocity computed without including flap angle. Thus, for every flap angle position, a new take-off velocity signal will be sent to indicator 64.

Another feature which may be incorporated to assist in computing take-off velocity is a fuel totalizer. At times an aircraft will be held up before take-off, and will consume a considerable amount of fuel while waiting. The gross weight of the aircraft will decrease as fuel is consumed, and the lift needed for take-off is correspondingly reduced. A device such as a fuel totalizer can be utilized to sense the amount of fuel consumed or remaining and vary a potentiometer, such as that of numeral 175 of FIG. 5, and indicate that a change in aircraft weight has taken place. Obviously both aircraft weight and flap angle could be sensed simultaneously and utilized to vary the indicated take-off velocity signal which is sent to indicator 64.

While a preferred embodiment of the invention is shown for illustration purposes, it will be obvious to those skilled in the art that many deviations may be made therefrom without departing from the scope of the invention.

I claim:

1. Apparatus to ascertain early in airplane take-off roll whether the airplane will be airborne at desired take-off point comprising a differential pressure transducer having a pitot and a static pressure tap to ascertain airplane ground velocity, means to ascertain airplane ground acceleration, an electrical differential circuit to convert said velocity and acceleration to derivative signals, means to determine the remaining runway time of the total runway time calculated to arrive at the desired take-off point, an electrical multiplier to multiply the sum of said derivative signals by said remaining runway time to obtain a product, electrical means to add said product and said velocity to obtain a predicted desired take-off point velocity, and electrical signal comparison means to compare said predicted desired take-off point velocity to required airplane velocity for take-off.

2. Apparatus to ascertain early in airplane take-off roll whether the airplane will be airborne at desired take-off point comprising means to ascertain airplane ground velocity, second means to ascertain airplane ground acceleration, third means to determine the remaining runway time of the total runway time calculated to arrive at the desired take-off point, fourth means to convert said velocity and acceleration to derivative signals and add said signals to obtain a sum and multiply said sum by said remaining runway time to obtain a product, means to add said product and said velocity to obtain a predicted desired take-off point velocity, signal means to compare said predicted desired take-off point velocity to required airplane velocity for take-off, and means to prevent the actuation of said apparatus until a preselected acceleration is maintained for a preselected period of time.

3. Apparatus to ascertain early in airplane take-off roll whether the airplane will be airborne at desired take-off point comprising means to ascertain airplane ground velocity, means to ascertain airplane acceleration, means to determine the remaining runway time of the total runway time calculated to arrive at the desired take-off point, means to differentiate said velocity and acceleration and multiply the sum of said differential velocity and acceleration by said remaining runway time to obtain a product, means to add said product and said velocity to obtain a predicted desired take-off point velocity, and signal means to compare said predicted desired take-off point velocity to required airplane velocity for take-off.

4. Apparatus to ascertain early in airplane take-off roll whether the airplane will be airborne at desired take-off point and to ascertain when final runway refusal point has been reached comprising means to ascertain airplane ground velocity, means to ascertain airplane ground acceleration, means to determine the remaining runway time of the total runway time calculated to arrive at the desired take-off point, means to convert said velocity and acceleration to derivative signals and add said signals to obtain a sum and multiply said sum by said remaining runway time to obtain a product, means to add said product and said velocity to obtain a predicted desired take-off point velocity, signal means to compare said predicted desired take-off point velocity to required airplane velocity for take-off, means to produce a signal corresponding to the time calculated to reach said final runway refusal point, and means to compare the time calculated to reach said final runway refusal point to said remaining runway time.

5. Apparatus to ascertain early in aircraft runway roll whether the aircraft will be airborne at desired take-off point comprising means to provide a present aircraft velocity signal, means to provide a first aircraft acceleration signal, means to differentiate said velocity signal to provide a second acceleration signal, means to differentiate said first acceleration signal to provide an acceleration derivative signal, means to add said acceleration derivative signal and said first acceleration signal to provide a sum signal, an initiator circuit energized by said sum signal, a time computer triggered by said initiator circuit to provide an elapsed time signal after one of said sum signals has attained a preselected intensity for a period of time, means to provide a signal to said time computer corresponding to calculated total runway time for the aircraft to arrive at the desired take-off point, means to subtract said elapsed time signal from said calculated total aircraft runway time to the desired take-off point signal to provide a remaining runway time signal, means to multiply said remaining runway time signal by the sum signal to provide a product, means to amplify said product, means to add said product to said present aircraft velocity signal to obtain a sum to provide a predicted future velocity signal, means to provide a required aircraft velocity for take-off signal, and means comparing said required aircraft velocity for take-off signal and said predicted future velocity signal.

6. Apparatus to ascertain early in aircraft runway roll whether the aircraft will be airborne at desired take-off point comprising means to provide a present aircraft velocity signal, means to differentiate said present aircraft velocity signal into an acceleration signal, means to provide a present aircraft acceleration signal, means to differentiate said present aircraft acceleration signal, means to add said velocity differential signal and said acceleration differential signal to produce first sum signal, means to amplify said first sum signal, an initiator circuit energized by said first sum signal when said first sum signal has attained a preselected intensity for a period of time, a time computer triggered by said initiator circuit to provide an elapsed time signal, means to provide a signal to said time computer corresponding to calculated total runway time for the aircraft to arrive at the desired take-off point, means to subtract said elapsed time signal from said calculated total aircraft runway time signal to provide a remaining runway time signal, means to multiply said remaining runway time signal by said first sum signal to provide a product, means to amplify said product, means to add said product to said present aircraft velocity signal to obtain a second sum, means to provide a required aircraft velocity for take-off signal, means comparing said required aircraft velocity for take-off signal and said second sum, means to provide a calculated take-off refusal time signal, and means to compare said calculated take-off refusal time signal and said remaining runway time signal.

References Cited in the file of this patent

UNITED STATES PATENTS 2,807,165　　Kuzyk ------------------ Sept. 24, 1957

OTHER REFERENCES

Klass, "Monitor Designed to Aid Jet Take-Offs," Aviation Week magazine, June 23, 1958, pages 65, 67, 69, 70 and 71; copy in 73—178.

Publication, "Takeoff Monitors Compete for Market," Aviation Week magazine, July 28, 1958, pages 77–79; copy in 73—178.

Morris et al., NACA Technical Note 3252, November 1954, 19 pages; copy in Scientific Library, TL 521 U 58.